March 30, 1954  H. G. BAILEY  2,673,510
SUBSOILER
Filed Sept. 27, 1949
2 Sheets-Sheet 1
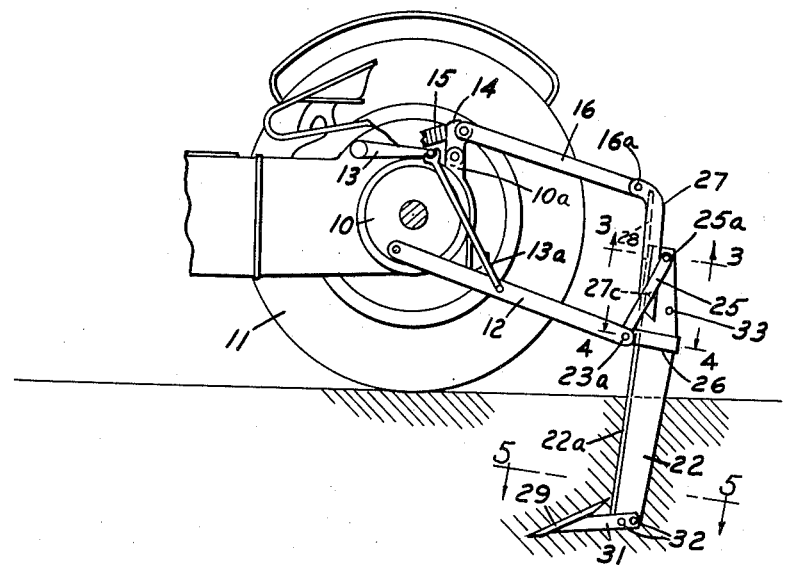
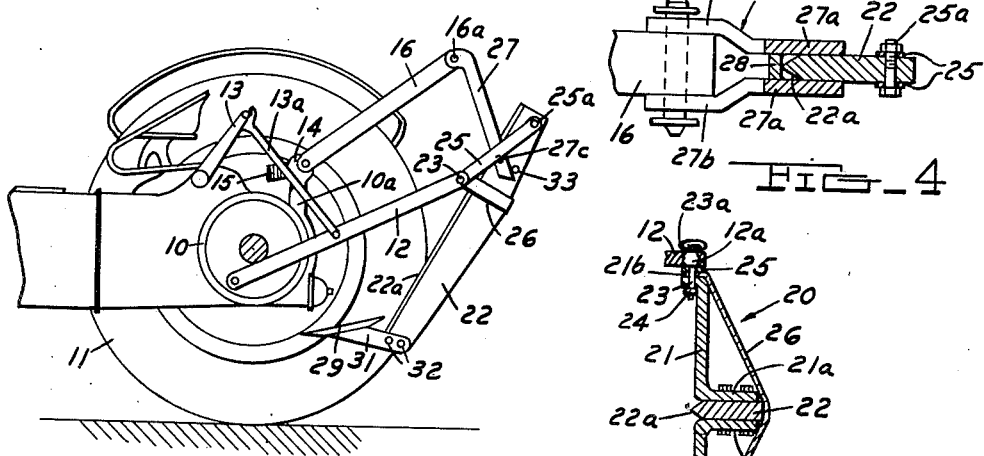
INVENTOR.
HAROLD G. BAILEY
BY
ATTORNEY March 30, 1954
H. G. BAILEY
2,673,510
SUBSOILER
Filed Sept. 27, 1949
2 Sheets-Sheet 2
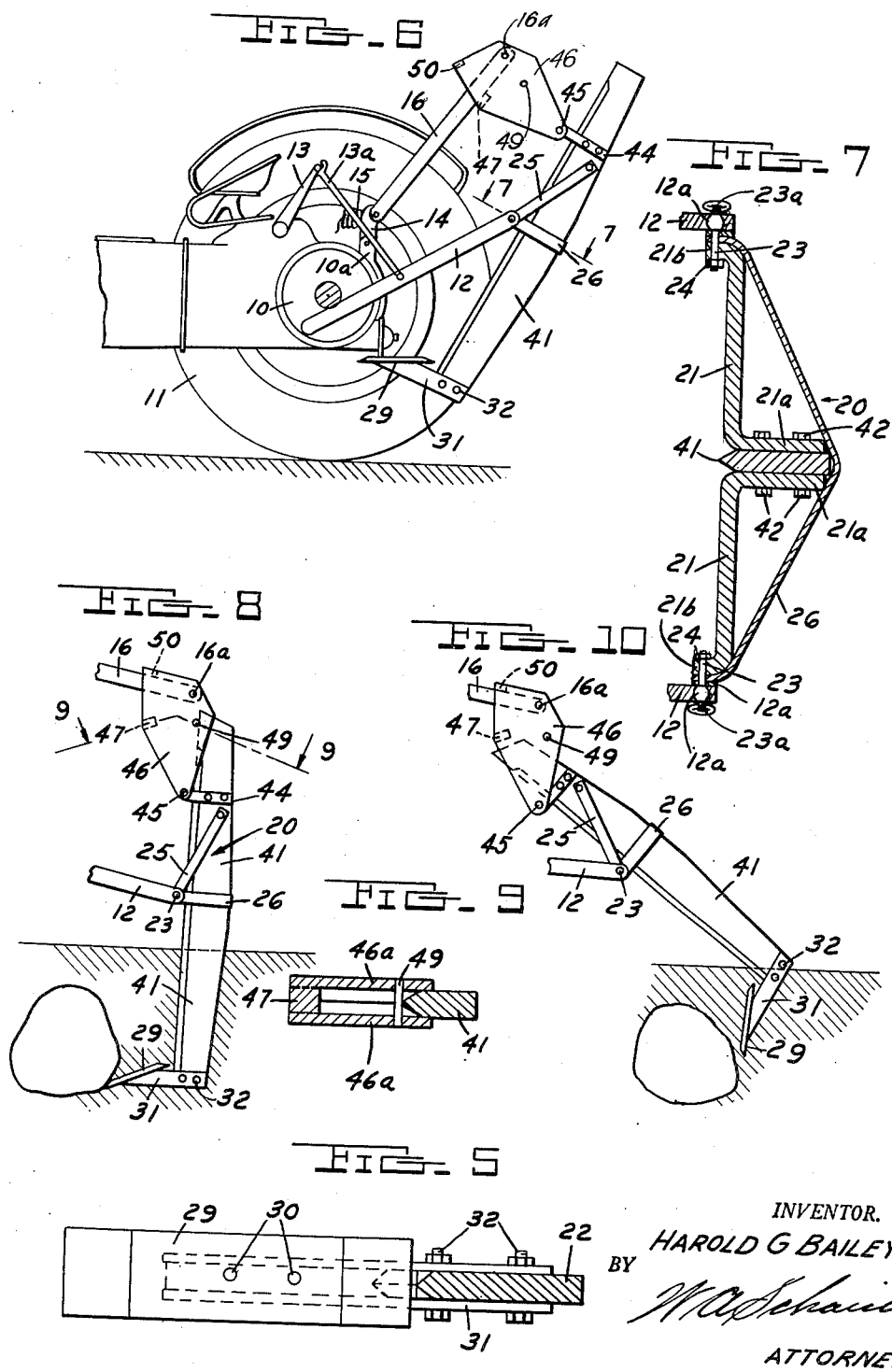
INVENTOR.
HAROLD G BAILEY
BY
ATTORNEY Patented Mar. 30, 1954

2,673,510

UNITED STATES PATENT OFFICE 2,673,510

SUBSOILER

Harold G. Bailey, Berkley, Mich., assignor, by mesne assignments, to Ford Motor Company, Dearborn, Mich., a corporation of Delaware Application September 27, 1949, Serial No. 118,045

5 Claims. (Cl. 97—47.5)

This invention relates to an improved construction of a farm implement of the type referred to as a subsoiler.

In recent years, there has been a considerable demand for a soil breaking tool which will operate at depths of from 12 to 24 inches below the surface to effect a breaking up or splitting of the so called "hard pan" which forms in certain soils after a few years of plowing to the usual depth. This invention provides an implement of this general type which is unusually adaptable for use with tractors having power lifted vertically swingable hitch links.

A feature of this invention is a provision of a strong, rugged implement of the subsoiler type which may be economically manufactured and conveniently assembled to the trailing hitch links of conventional tractors. An important feature of this invention is the arrangement of the mechanism by which the subsoiler is connected to the tractor in such manner that when the subsoiler is lifted out of its working position, the ground engaging portion is thereby gravitationally biased to swing to a position substantially forward of and above its ground working position, where it will underlie the hitch links of the tractor and may be conveniently transported across fields without danger of it becoming entangled in brush or other obstructions over which the tractor might pass.

According to one modification of this invention, the beam of the subsoiler is retained in its working position against the ground reaction forces produced thereon by a shear pin which is so proportioned as to rupture whenever the implement encounters an obstruction with sufficient force that damage to the implement or tractor would otherwise result. Still another feature of this modified form of this invention is the provision of means for positively swinging the ground working portion of the subsoiler to a position forward of its working position when raised out of the ground to facilitate the transporting of the implement.

Accordingly, the object of this invention is the production of an improved farm implement of the subsoiler type, characterized by unusual simplicity of construction and ease of manufacture and assembly. A further object of this invention is the provision of an improved linkage for effecting the connection of an implement of the subsoiler type to a tractor having three vertically swingable hitch links so as to permit the subsoiler to automatically swing forward to a more convenient position for transport whenever it is lifted out of ground engagement.

Another object of this invention is the provision of a linkage for connecting a subsoiler to a tractor in which a shear pin may be conveniently provided to retain the subsoiler in its working position against the ground reaction forces thereon, and thereby protect both the tractor and implement from the development of excessive forces whenever a substantial obstruction is encountered by the ground engaging portion of the subsoiler.

The specific nature of this invention, as well as other objects and advantages thereof, will become apparent to those skilled in the art from the following detailed description taken in conjunction with the attached drawings on which, by way of preferred example only, are illustrated two embodiments of this invention.

On the drawings:

Figure 1 is a side elevational view of a preferred form of subsoiler type farm implement embodying this invention, showing the implement in assembled relationship with respect to the tractor and in its ground working position.

Figure 2 is a view similar to Figure 1 but showing the implement in its transport position.

Figure 3 is an enlarged scale sectional view taken on the plane 3—3 of Figure 1.

Figure 4 is a sectional view taken on the plane 4—4 of Figure 1.

Figure 5 is an enlarged scale sectional view taken on the plane 5—5 of Figure 1.

Figure 6 is a side elevational view of a modified form of subsoiler embodying this invention, showing the subsoiler in its transport position.

Figure 7 is an enlarged scale sectional view taken on the plane 7—7 of Figure 6.

Figure 8 is a schematic view showing the implement of Figure 6 in its ground working position just prior to striking an obstruction.

Figure 9 is a sectional view taken on the plane 9—9 of Figure 8.

Figure 10 is a schematic view similar to Figure 8 but illustrating the position of the implement after rupture of the shear pin.

As shown on the drawings:

The rear end portion of a well-known type of tractor is shown on the drawings as comprising a rear axle casing 10 on which are conventionally mounted a pair of rear wheels 11. At spaced points on either side of the center of rear axle casing 10 a pair of hitch links 12 are pivotally mounted for vertically swingable movement. The hitch links 12 may be raised and lowered at the will of the operator through the conventional hydraulic mechanism (not shown) which produces a rotation of rocker arms 13 and a lifting force upon lifting links 13a respectively connected to hitch links 12. At the top central portion of the rear axle casing 10, an integral mounting bracket 10a is provided, and such pivotally mounts an angle link 14 which provides the operating connection between the hydraulic system control spring 15 and the top or compression link 16 of the conventional three link hitch. All of the foregoing elements will be recognized to be conventional and well-known and further description thereof is deemed unnecessary.

A subsoiler embodying this invention comprises a frame structure 20 which comprises a pair of reversely bent angles 21 having their one end portion 21a respectively bolted to opposite sides of beam 22. The other ends 21b of angles 21 are thus disposed in spaced parallel relation and each of such ends 21b has a pivot bolt 23 secured thereto by a nut 24. Each pivot bolt 23 includes an outwardly projecting cylindrical portion 23a which is suitably constructed so as to be received in the spherical type bearings 12a provided in the ends of the hitch links 12. Brace straps 25 are also mounted on each of the pivot bolts 23 and have their other ends secured to the top end of the beam 22 as by bolt and nut units 25a. Likewise, a surrounding strap 26 has its ends secured to pivot bolts 23 and its central portion welded to the rear edges of angles 21. Accordingly, it will be seen that the frame structure 20 is rigidly secured to the beam 22 and is pivotally attachable to the lower hitch links 12 of the tractor so as to pivot in a vertical plane relative to such links unless otherwise restrained.

The required restraints on the pivotal movement of the beam 22 and frame 20 are provided by a connecting linkage 27 which provides a connection between the beam 22 and the end of the top link 16 of the tractor. Connecting link 27 may conveniently comprise a pair of elongated plates or straps 27a which are rigidly secured together in spaced relationship by a web plate 28 which is secured between the plates 27a as by welding. The top ends of plates 27a are flared outwardly as at 27b to straddle the end of top link 16 and is secured thereto by pin 16a. A pin 27c provides a pivotal connection of plates 27a to the top end of beam 22. The bottom of web plate 28 projects into the path of pivotal movement of the top end of beam 22 so as to limit counterclockwise movement of beam 22, as best shown in Figure 1, when the beam 22 is in a substantially upright position and this position constitutes the soil working position of beam 22.

To effect the desired splitting or breaking action of the soil, a soil working blade 29 is secured to the bottom end of beam 22 in any conventional fashion, such as by being bolted by bolts 30 (Figure 5) to a support bracket 31 which is, in turn, bolted by bolts 32 to the bottom end portion of beam 22. Since implements of this type are generally utilized at working depths in excess of 12 inches, the forward edge of beam 22 is provided with a V-shaped configuration, as indicated at 22a, to facilitate the passage of the tool through the ground. If desired, the sharpened edge 22a is provided along the full length of beam 22 and the various bolt holes are duplicated in each end so that the beam 22 may be reversed end for end relative to frame 20, thus doubling the period of use before resharpening of edge 22a would be required.

It will be appreciated that when the links 12 are lowered by the tractor operator to a position corresponding to the depth at which the subsoiling is to be accomplished, the weight of the beam 22 and associated frame 20, coupled with the suck of the blade 29, will cause the blade 29 to enter the soil and work down to a depth limited by the setting of the hydraulic mechanism which controls the position of the hitch links 12. In any such working position, the soil reaction forces on the bottom end of beam 22 inherently tend to produce a counterclockwise rotation of the beam 22 about its pivotal connections to the ends of the hitch links 12. Such rotation is, however, limited by the engagement of the top end of the beam 22 with the web plate 28 and the beam 22 is thus maintained in a substantially vertical position at all times that the blade 29 is in engagement with the ground.

It is a particular feature of this invention that the weight distribution of the entire implement is arranged so that the center of gravity of the entire beam and frame assemblage is disposed substantially rearwardly of the blade 29. Accordingly, whenever the hitch links 12 are raised to lift the subsoiler out of ground engagement, the beam 22 will be gravitationally urged to pivot about the ends of the hitch links 12 in a clockwise direction as viewed in Figure 2, to assure a gravitationally neutral position, wherein the ground working blade 29 is disposed substantially forwardly of its working position. See Figure 2. The weight of top link 16 and connecting linkage 27 of course contribute to such gravitational displacement of the ground working blade 29. In other words, the bottom end of the subsoiler tends to swing forwardly and upwardly beneath the ends of the tractor hitch links, and it will be recognized that the implement thus assumes a very convenient position for transport, particularly if the tractor has to be driven across fields where brush or other entangling vegetation may be encountered. To prevent any excessive forward swinging motion of the beam 22, which might be produced by the jars of travel over rough ground, a stop pin 33 may be mounted in the beam 22 in projecting relation so as to encounter the bottom ends of the connecting link 27 and thereby limit any excessive clockwise displacement of the beam 22.

Referring now to Figures 6 through 10, a modification of this invention is there shown which provides several additional features over the modification already described. In the modified construction, a frame 20 is provided which is substantially identical to the frame structure previously described and which is bolted to the central portion of a beam 41 as by bolt and nut units 42. The outer ends 21b of the frame 20 are again pivotally attached to the ends of the tractor hitch links 12. A U-shaped strap 44 is bolted to the beam 41 at a position somewhat above the frame 20 and the ends of the strap 44 project forwardly and are pivotally secured by pivot bolt 45 to the bottom ends of a connecting link 46. Connecting link 46 comprises a pair of generally triangular plates 46a which are suitably spaced by a stop block 47 welded therebetween to straddle the end of the top link 16 and are pivotally connected to the top link by pin 16a.

The bottom end of beam 41 carries a soil working blade 29 and supporting bracket 31 which is identical to that heretofore described in connection with the other modification of this invention. It will be noted that the top end of beam 41 may pass between the plates 46a of the connecting link 46 as the beam 41 pivots in a counterclockwise direction as viewed in Figure 6. To limit such pivotal movement of beam 41 and to position such beam in its proper working position, a combined stop and safety element is provided in the form of a shear pin 49 which traverses the spaced plates 46a of the connecting link 46. Accordingly, whenever the soil working blade 29 of the subsoiler encounters an obstruction with sufficient force as would tend to injure either the tractor or the subsoiler, the shear pin 49 will break and permit the beam 41 to freely pivot in a counterclockwise direction and thus the blade will raise out of the ground and clear the obstruction, as indicated in Figure 10. Obviously, a new shear pin may be quickly inserted in the holes provided for it in the connecting link plates 46a and the implement will be then restored to operative condition.

In the modification of Figures 6 and 10, the weight distribution of the frame and beam assemblage is again preferably such as would tend to produce a pivotal movement of the frame and beam about its mounting on the ends of hitch links 12 when the implement is raised out of soil engaging position. It often happens that considerable vegetation, brush or other trash may collect on the bottom end of the beam 41 and the weight of such collection may conceivably prevent the gravitationally induced pivotal movement of the beam 41 to its transport position. To prevent this contingency, the spacer block 47 is welded between the plates 46a and connection link 46 in such position as to engage the top link 16 when the hitch links 12 have been raised sufficiently to bring the soil working blade 29 out of the surface of the ground. When such engagement occurs, the connecting link 46 in effect becomes rigid with respect to the top link 16 and the result is to produce a positive force on the top end of beam 41 tending to rotate the beam 41 in a clockwise direction and thereby insure that the soil working blade 29 is swung forwardly and upwardly to its transport position.

If it is desired to permit backing movement of the tractor and implement, a second stop block 50 may be welded between plates 46a at a position above link 16.

From the foregoing description, it is readily apparent that this invention provides a subsoiler of unusually simple, rugged and economically manufacturable construction. When employed with a tractor having a three link hitch arrangement, the subsoiler may be assembled to the tractor through the simple expedient of completing three pivot connections. Furthermore, in both modifications of this invention, the subsoiler is positively mounted in a proper working position relative to the tractor at all times when the soil working blade is in contact with the ground. When raised out of ground engagement, the subsoiler automatically swings to a position up under the hitch links of the tractor where it may be most conveniently transported.

I claim:

1. An implement for use with a tractor having transversely-spaced vertically swingable hitch links and a pivoted top link, comprising a frame adapted for pivotal mounting on said hitch links, said frame including a depending beam, a ground working tool attached to the bottom end of said beam, an intermediate link having its ends respectively pivotally mounted to said beam and said top link, and a stop on said intermediate link limiting ground reaction produced pivotal movement thereof relative to said frame, thereby securing said beam against ground reaction forces encountered in its ground working position, said stop permitting a forward angular displacement of the bottom end of said beam when raised out of ground engagement, and means operating between said intermediate and said top link to form a rigid connection therebetween as said hitch links are raised to their highest positions, thereby pivoting said frame and beam to swing said ground engaging tool forwardly.

2. An implement for use with a tractor having transversely-spaced, vertically swingable hitch links and a pivoted top link, comprising a frame adapted for pivotal mounting on said hitch links, a beam secured to said frame, a ground working tool attached to the bottom end of said beam, an intermediate link having its ends respectively pivotally mounted to said beam and said top link, and a first stop operable between said intermediate link and said beam for limiting ground reaction produced, relative pivotal movement thereof, thereby securing said beam against ground reaction forces encountered in its ground working position, said first stop permitting a forward angular displacement of the bottom end of said beam when raised out of ground engagement, and a second stop on said intermediate link positioned to abut said top link as said hitch links are raised to their highest position, whereby said frame and beam are pivoted on said hitch links to swing said ground working tool forwardly for transport purposes.

3. A subsoiler for use with a tractor having a pair of lower, trailing, laterally spaced, power-liftable draft links and a trailing central top link, said top link being pivoted to the tractor on an axis vertically spaced above the axis of said lower links, comprising a vertically disposed beam, a ground working tool at the foot of said beam, a mounting frame for pivotally joining said beam to said links including a lower frame section rigid with a medial portion of said beam and having lateral pivot pins for pivotal attachment to said lower links, and an intermediate link for freely pivotally connecting an upper portion of said beam to the trailing end of said top link, a first stop operatively interposed between said beam and said intermediate link to limit movement of said beam upper portion toward the tractor with said beam and said intermediate link in substantially vertical longitudinal alignment when said tool is in a workng position, the lower rear extremity of said subsoiler being movable in an arcuate path about the point of pivotal attachment of said beam and said lower links, said arcuate path being primarily upwardly and forwardly, the subsoiler center of gravity being located rearwardly of said pivot pins when said beam is in a substantially vertical position, so that raising of said draft links allows free tilting movement of said beam to bring the center of gravity thereof into substantial vertical alignment with said pivot pins with said beam moving toward a horizontal position and said tool being shifted forwardly and upwardly to increase the ground clearance thereof, and stop means including an abutment surface on said intermediate link limiting movement of said beam to halt free tilting movement of the same short of a horizontal position.

4. A subsoiler for use with a tractor having a lower, trailing, power-liftable draft link and a trailing top link, comprising a generally vertically extending beam, a ground working tool at the foot of said beam, a mounting frame for pivotally joining said beam to said links including means located forwardly of the beam for pivotally connecting a medial portion of said beam to said lower link and an upstanding frame element for pivotal connection to the trailing end of said top link in substantial vertical alignment with said means connecting the beam and said lower links, means pivotally interconnecting said frame element and an upper portion of the beam rearwardly of a plane passing through the trailing ends of said links, and stop means including an abutment surface on said beam to limit movement of said beam upper portion toward the tractor with said beam being substantially vertical when said tool is subjected to ground reaction forces during working, the lower rear extremity of said subsoiler being movable in an arcuate path about the point of attachment of said beam and said lower link, said arcuate path being primarily upwardly and forwardly, the center of gravity of said subsoiler being located rearwardly of the point of attachment of said beam to said lower link and said pivotal interconnecting means also being located rearwardly of said point of attachment to facilitate free movement of said beam toward a horizontal position and shifting of said tool forwardly and upwardly to increase the ground clearance thereof upon power-lifting of said lower link to raise said tool from the ground.

5. A subsoiler for use with a tractor having a lower, trailing, power-liftable draft link and a trailing top link, said links being pivoted to the tractor on vertically spaced axis, comprising a vertically extending beam, a ground working tool at the foot of said beam, a mounting frame for pivotally joining said beam to said links including means rigid with a medial portion of said beam and extending forwardly therefrom for pivotal attachment to said lower link, an intermediate link pivotally attached to an upper portion of said beam above and rearwardly of the point of attachment of said frame to said lower link, said intermediate link extending upwardly beyond said beam for attachment to said top link, and a stop operatively interposed between said beam and said intermediate link to limit movement of said beam upper portion toward the tractor with said beam assuming a substantially vertical position with the lower rear extremity of said subsoiler being substantially vertically aligned with the point of attachment of said beam and said lower link when the beam is subjected to ground reaction forces during working, elevation of said lower link effecting free pivoting movement of the beam relative to the intermediate link so that the upper end of said beam and said mounting frame move rearwardly about the point of attachment to said lower link toward a horizontal position and said tool is shifted forwardly and upwardly to increase the ground clearance thereof.

HAROLD G. BAILEY.

References Cited in the file of this patent
UNITED STATES PATENTS

| Number | Name | Date |
| --- | --- | --- |
| 1,855,604 | Lindeman | Apr. 26, 1932 |
| 2,398,991 | Arps | Apr. 23, 1946 |
| 2,465,831 | Arps | Mar. 29, 1949 |
| 2,487,955 | Todd | Nov. 15, 1949 |
| 2,548,461 | Arps | Apr. 10, 1951 |
| 2,619,016 | Dooley | Nov. 25, 1952 |